United States Patent [19]
Ejiri

[11] Patent Number: 5,224,348
[45] Date of Patent: Jul. 6, 1993

[54] CORELESS TORQUE CONVERTER

[75] Inventor: Eiji Ejiri, Sagamihara, Japan

[73] Assignee: Nissan Motor Co., Ltd., Japan

[21] Appl. No.: 735,228

[22] Filed: Jul. 24, 1991

[30] Foreign Application Priority Data

Jul. 27, 1990 [JP] Japan .................................. 2-199877
Jul. 27, 1990 [JP] Japan .................................. 2-199878

[51] Int. Cl.$^5$ ............................................. F16D 33/00
[52] U.S. Cl. .......................................... 60/361; 60/364; 60/366
[58] Field of Search .................. 60/330, 341, 345, 349, 60/350, 351, 361, 362, 364, 366; 416/197 C

[56] References Cited

U.S. PATENT DOCUMENTS

| | | | |
|---|---|---|---|
| 3,125,857 | 3/1964 | Schneider | 60/361 |
| 3,138,107 | 6/1964 | Zeidler | 60/361 |
| 4,129,000 | 12/1978 | Umeda et al. | 60/361 |
| 4,186,557 | 2/1980 | Arai et al. | 60/361 |
| 4,441,315 | 4/1984 | Bochot | 60/345 |

OTHER PUBLICATIONS

SAE Paper No. 861,1213, by Szydelski, "New Type Three Element Torque Converter and Its Application to Mobile Equipment", Sept., 1986.
"Design of Hydraulic Power Transmission" by Ishihara et al. OHM-Sha, Tokyo, Japan, 1967, pp. 23-25.

Primary Examiner—Richard A. Bertsch
Assistant Examiner—Todd Mattingly
Attorney, Agent, or Firm—Lowe, Price, LeBlanc & Becker

[57] ABSTRACT

A coreless torque converter has a unique layout or arrangement of stator, pump impeller and turbine runner, in which at least one of these elements has a portion formed to have an axial dimension which is reduced to minimize an offset amount of a center of swirl generated by working fluid recirculating through the converter to provide a high torque ratio and improved efficiency.

11 Claims, 6 Drawing Sheets

FIG_2

FIG_3

FIG._4

FIG_5

CORELESS TORQUE CONVERTER

BACKGROUND OF THE INVENTION

1. Field of the Invention

The present invention relates to a coreless torque converter which is not provided with a core ring at a location where tip ends of respective vanes of the torque converter elements are arranged in close vicinity with each other.

BACKGROUND OF THE PRIOR ART

A typical example of such construction of coreless torque converter is disclosed, e.g., in SAE Paper No. 861213, and will be briefly explained below with reference to FIG. 6. The coreless torque converter shown in FIG. 6 is of a three-element two-phase type, and includes a pump impeller 01, a turbine runner 02 and a stator 03. The coreless torque converter is not provided with a core ring at a location where tip ends of respective vanes of the above-mentioned three torque converter elements are arranged in close vicinity with each other.

In conventional coreless torque converters, due to the absence of a core ring for restricting working fluid flow recirculating through the converter by forming a definite fluid flow path the center of swirl generated in the fluid flow tends to be offset toward the turbine runner and this lowers the stalling torque ratio and power/torque transmission efficiency as compared with an ordinary torque converter provided with a core ring. For this reason, it has been generally considered difficult to apply a coreless torque converter to automotive vehicles with a relatively small displacement volume of the engine. Moreover, because of lower torque ratio and power transmission efficiency, the coreless torque converter tends to degrade fuel economy under particular vehicle driving conditions, e.g., where starting and stopping of the vehicle are repeatedly performed.

SUMMARY OF THE INVENTION

It is therefore a primary object of the present invention to provide in a preferred embodiment an improved coreless torque converter which eliminates or at least mitigates the above-mentioned drawbacks of the prior art, and provides satisfactorily high torque ratio and efficiency.

To this end, the present invention employs a unique layout or arrangement of the stator, the pump impeller and the turbine runner, for minimizing the offset amount of center of swirl generated by the recirculating working fluid.

More particularly, according to one aspect of the invention, there is provided a coreless torque converter which comprises: a pump impeller associated with a prime mover to be driven by output torque thereof; a turbine runner arranged opposite to the pump impeller, for hydrodynamically receiving the driving torque from the pump impeller and transmitting the driving torque to an output shaft; and a stator arranged within a predetermined clearance defined between the pump impeller and the turbine runner; the pump impeller, the turbine runner and the stator having respective vanes whose tip ends are arranged in close vicinity to each other; at least one of the pump impeller, the turbine runner and the stator having an axial dimension which is at least partly so reduced that flow of fluid recirculating through the torque converter is deflected to minimize an offset amount of center of swirl of the recirculating fluid relative to center of the vane tip ends of the pump impeller, the turbine runner and the stator.

Preferably, at least one of pump impeller and the the stator has associated vanes with an axial dimension which is reduced to obtain a shifting of the swirl center toward the center of vane tip ends. In such an instance, one or both of the pump impeller and the stator may have a reduced dimension of their respective vanes for defining a clearance between the stator and the pump impeller which is greater than a clearance between the stator and the turbine runner.

According to one preferred embodiment, the clearance between the stator and the pump impeller is greater than the clearance between the stator and the turbine runner within a range of 2 to 20 times the latter clearance.

According to an alternative embodiment, the turbine runner has an axial dimension which is smaller than a standard or normal dimension. In such an instance, the turbine runner may have an axial dimension which is smaller than the axial dimension of the pump impeller, and which may be within a range of 0.9 to 0.5 times the axial dimension of the pump impeller.

DESCRIPTION OF THE PREFERRED EMBODIMENTS

The present invention will now be explained in further detail, by referring to the preferred embodiments shown in the accompanying drawings.

Figure 1:
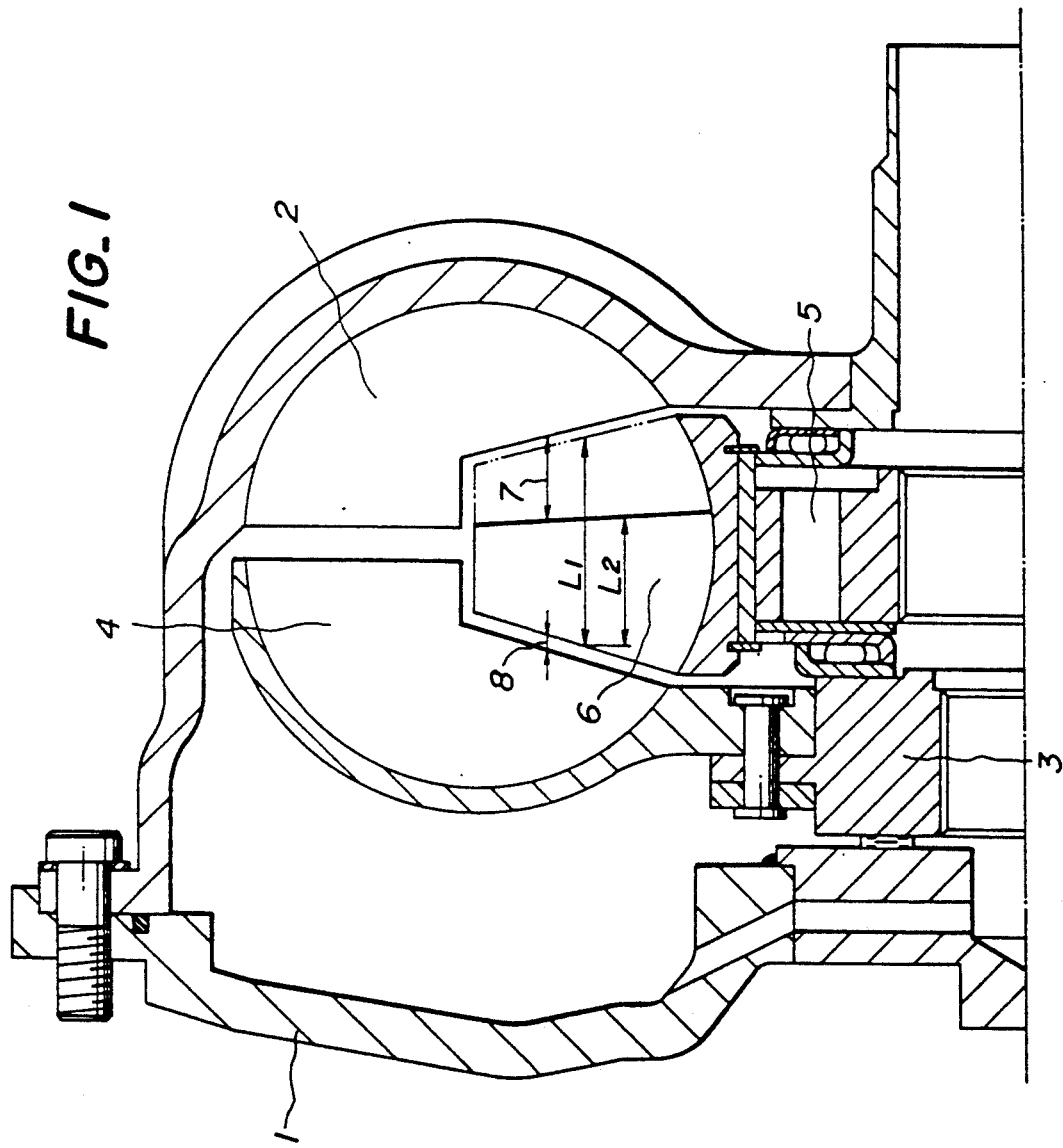
FIG. 1 is a schematic sectional view of a coreless torque converter according to a first embodiment of the present invention.

Referring to FIG. 1, there is shown a coreless torque converter according to a first embodiment of the present invention, including a converter cover which is coupled with an automotive internal combustion engine (not shown) and is adapted to be driven by the output torque of the latter. A pump impeller 2 is coupled with the converter cover 1 for rotation therewith, and has a plurality of vanes arranged in a circumferential direction at predetermined regular intervals. The pump impeller 2 carrying the associated vanes is driven by the input torque transmitted from the converter cover 1 to generate a fluid flow which recirculates through the torque converter. A turbine runner 4 is arranged opposite to the pump impeller 2, and is also provided with a plurality of vanes arranged in a circumferential direction at predetermined regular intervals. The turbine runner 4 as coupled with the pump impeller 2 forms a fluid coupling so that it can be driven by the input torque via recirculating fluid. An input shaft (not shown) of an automatic power transmission is rigidly connected to the turbine runner 4 via a turbine hub 3 for rotation therewith. A one-way clutch 5 serves to support on a casing (not shown) a stator 6 which is disposed within a space defined between the pump impeller 2 and the turbine runner 4. Similarly to the pump impeller 2 and the turbine runner 4, the stator 6 is provided with a plurality of vanes which are arranged circumferentially with a predetermined regular interval. The respective vane edges of the pump impeller 2, the turbine runner 4 and the stator 6 are arranged in close proximity to each other, without the provision of a core ring at a location where the aforementioned three elements 2, 4 and 6 congregate, as can be readily appreciated from FIG. 1.

The general construction of the coreless torque converter and arrangement of its elements, per se, are well known in the art. One typical example of the coreless torque converter to which the present invention is applicable is disclosed in the aforementioned SAE Paper No. 861213, so that the entire disclosure of this publication is herein incorporated by reference for the sake of disclosure.

According to the embodiment shown in FIG. 1, the pump impeller 2 and the turbine runner 4 are each formed into configuration which is essentially identical to conventional configuration. On the other hand, the stator 6 is formed to have a relatively small axial length for its vanes as compared with a conventional stator, by removing the portion of each vane situated in the vicinity of the pump impeller 2 as illustrated by phantom lines. See FIG. 1. Due to the removal of the relevant portion of the stator 6, the resulting axial clearance 7 between the stator 6 and the pump impeller 2 becomes much greater than the axial clearance 8 between the stator 6 and the turbine runner 4. As can be appreciated from FIG. 1, the clearance 7 between the stator 6 and the pump impeller 2 is preferably several times greater than the clearance 8 between the stator 6 and the turbine runner 4.

In the embodiment of FIG. 1, in order to compensate for the reduced area of each vane of the stator 6, the number of the stator vanes may be increased in a counterproportional sense so that the total vane area becomes comparable with that in the prior art wherein the stator vanes are not subjected to removal of material as in the above-mentioned embodiment.

Generally, the construction of a coreless torque converter can be regarded as a modified construction of a fluid coupling, in which only a pump impeller and a turbine runner are arranged opposite to each other. Therefore, the flow characteristics of the internally recirculating fluid in a coreless torque converter may be considered to exhibit behavior similar to that in the general fluid coupling.

Figure 2:
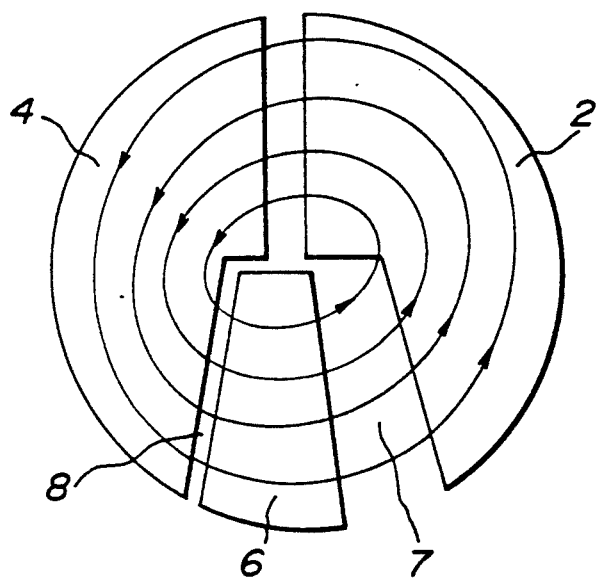
FIG. 2 is an explanatory view showing the flow pattern of working fluid recirculating in the torque converter of FIG. 1.

In this connection, reference may be had to "Design of Hydraulic Power Transmission" by Tomoo ISHIHARA et al., published by OHM-Sha, Tokyo, Japan in 1967, page 23, FIG. 2.11.

According to this publication, at medium and low speed ranges of the fluid coupling, the center of swirl of the recirculating fluid tends to be offset toward the turbine runner. The offset of the swirl center tends to degrade performance of the pump impeller in exciting the working fluid and transmitting the input torque to the fluid medium, and thereby lowers the stalling torque ratio and power transmission efficiency. Such an offset is generally believed to result from the tendency that a relatively large part of the fluid flowing into the stator subsequently flows over the tip ends of the stator vanes toward the pump impeller 2 and the turbine runner 4, as a kind of by-pass fluid flow which is believed to be a dominant factor in lowering the torque ratio and efficiency as set forth above.

The embodiment of FIG. 1 solves this problem in a unique manner by providing asymmetric clearances between the stator and the pump impeller and between the stator and the turbine runner. Namely, in the illustrated embodiment, since the clearance 7 is much greater than the clearance 8, the flow resistance at the clearance 7 is much smaller than that at the clearance 8. Therefore, the fluid can flow through the clearance 7 and is discharged through the discharge outlet with reduced amount of fluid flowing over the tip ends passing adjacent the stator 6, thereby assuring more efficient operation of the stator 6.

Due to the effect of the greater clearance 7 between the stator 6 and the pump impeller 2, the flow pattern of the working fluid becomes essentially like that shown in FIG. 2. As can be appreciated from FIG. 2, the offset amount of the center of swirl generated in the recirculating fluid becomes much smaller than that in the prior art.

Figure 3:
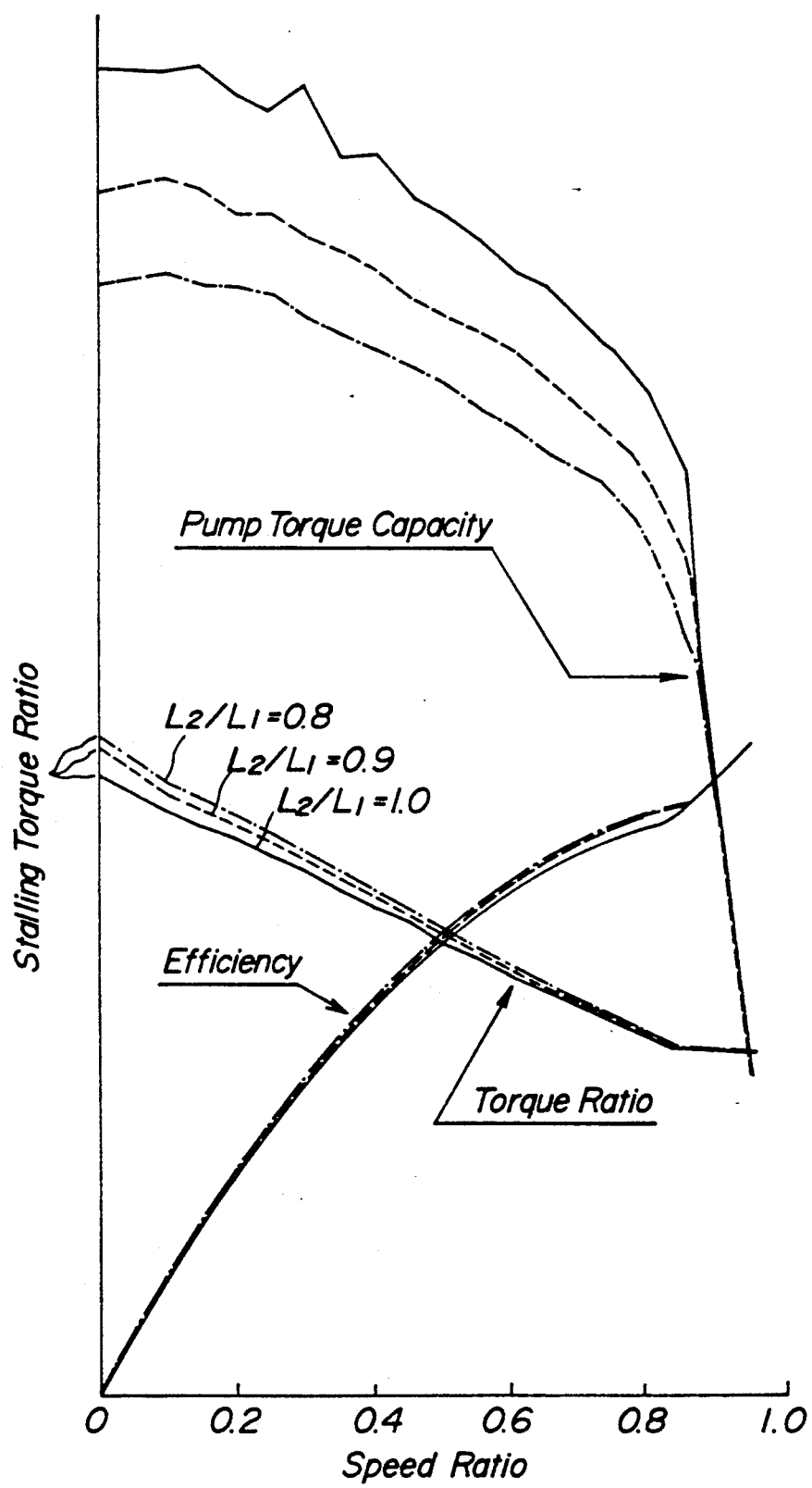
FIG. 3 is a characteristic diagram showing performance test results obtained by actual samples of the torque converter.

In order to determine the optimum configuration of the stator vanes, experiments were conducted with various ratios of the vane length $L_2$ versus original length $L_1$. The ratio $L_2/L_1$ is 1 in the coreless torque convertors of the prior art. Test samples were prepared to have stator vanes of $L_2/L_1$ ratio 1, 0.9 and 0.8 and subjected to performance tests, the results of which are shown in FIG. 3. It is clear that a value of $L_2/L_1$ in the range 0.8 and 0.9 exhibits higher stalling torque ratio and higher efficiency as compared with the conventional vane of $L_2/L_1$ ratio of 1.

The embodiment shown in FIG. 1 is advantageous in that it does not require additional components for improving performance of the torque converter, i.e. stalling torque ratio and efficiency, except for modification to the modification of the stator vanes which can be carried out without a substantial increase in the production cost. Since the embodiment of FIG. 1 provides higher stalling torque ratio and higher efficiency, it is possible to readily apply the coreless torque converter to vehicles with a relatively small engine displacement volume. Also, the torque converter does not degrade performance and fuel economy of the vehicle, even under driving conditions wherein starting and stopping of the vehicle are repeatedly performed. Moreover, the embodiment of FIG. 1 requires a modification only to the stator vane configuration, which is particularly advantageous from the viewpoint of design and reduce production cost, since it is not necessary to change the design of the pump impeller and the turbine runner.

Figure 4:
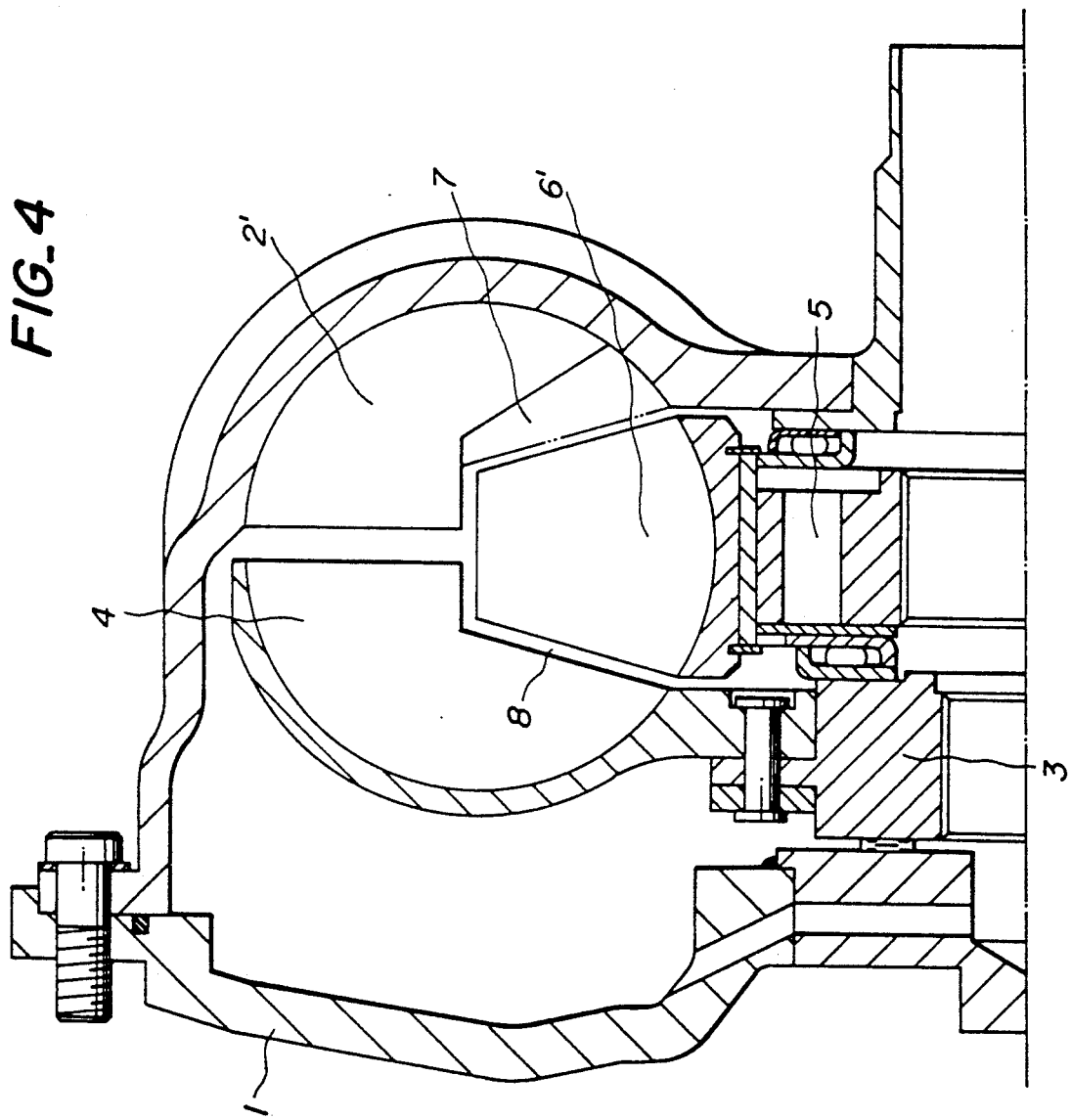
FIG. 4 is a sectional view of a coreless torque converter according to a second embodiment of the present invention.

FIG. 4 shows a coreless torque converter according to a second embodiment of the present invention, which differs from the previous embodiment in that, instead of modifying the configuration of the stator vane for obtaining a greater clearance 7 as in the previous embodiment, the stator 6' is maintained unchanged from the conventional configuration while the inlet section of the vane of the pump impeller 2' is cut-out. In this embodiment also, in order to compensate for the reduced area of each vane of the pump impeller 2', the number of vanes to be provided for the pump impeller 2' may be appropriately increased. The second embodiment serves to achieve essentially same advantages to the first embodiment.

It should be noted that, while the aforementioned first and second embodiments are to modify the vane configuration of either one of the stator 6 and the pump impeller 2, it is also possible to obtain the increased clearance 7 by forming cut outs in the vanes of both of the stator 6 and the pump impeller 2 to jointly define a greater clearance 7 in combination.

In either case, the ratio of the clearances 7 and 8 is preferably within a range of values from 2 to 20; i.e., the clearance 7 is 2 to 20 times greater than the clearance 8. When the ratio is less than two, or when the clearance 7 is not wide enough, it is difficult to achieve an effective improvement in the fluid flow resistance, whereby the torque ratio and the efficiency cannot be improved to an extent required. On the other hand, when the ratio is greater than 20, or when the clearance 7 is too wide, not only will an excessive load be applied to the stator but the torque capacity of the torque converter becomes unacceptably small. Also, a greater number of vanes have to be provided to compensate for the reduced vane area.

Figure 5:
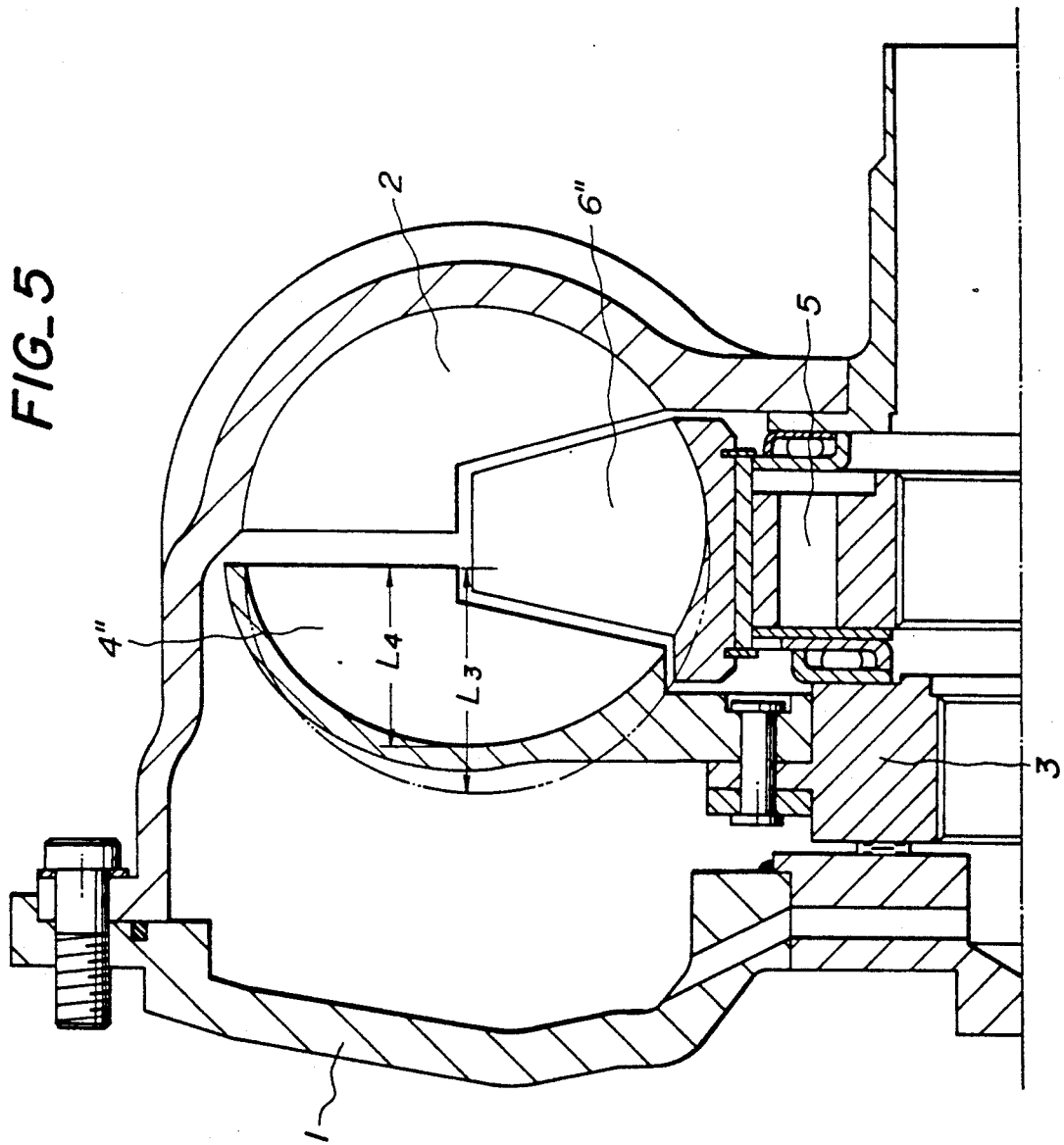
FIG. 5 is a sectional view of a coreless torque converter according to a third embodiment of the present invention.
Figure 6:
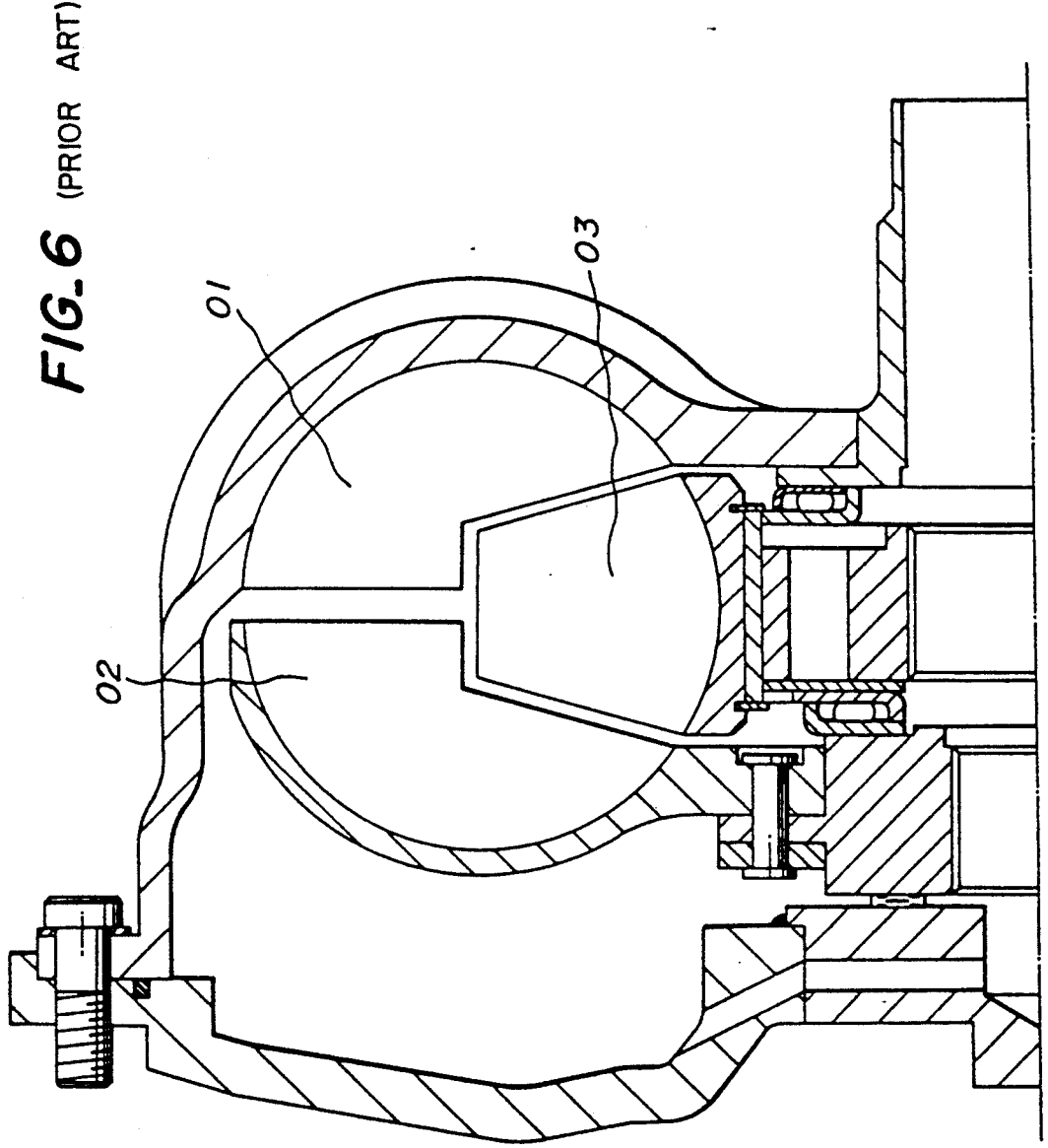
FIG. 6 is a sectional view of a conventional coreless torque converter.

FIG. 5 shows a coreless torque converter according to a third embodiment of the present invention, wherein the offset amount of the swirl center is minimized by reducing the axial dimension of the turbine runner 4" so as to be smaller than that of the pump impeller 2. It is of course true that reduction of the axial dimension of the turbine runner 4" requires a corresponding reduction of the at least the vane dimension in the stator 6". The reduced axial dimension $L_4$ of the turbine runner 4" is preferably within a range of 0.9 to 0.5 times the normal unreduced dimension $L_3$, due to the reasons which are essentially the same as the aforementioned preferred range of ratio of the clearances 7 and 8.

With the modification of the configuration of the turbine runner 4" to have a smaller axial dimension, the location of the swirl center is shifted toward the center between the pump impeller 2, the turbine runner 4" and the stator 6". The shift amount of the swirl center may be considered substantially proportional to the reduction ($L_3-L_4$) of axial dimension of the turbine runner 4". The construction of the embodiment of FIG. 5 also proved to exhibit markedly improved performance, i.e. higher stalling torque ratio and efficiency, as in the previous embodiments.

While the present invention has been explained with reference to certain specific embodiments, they were presented by way of examples only, and it is of course that various modifications and/or alterations may be made without departing from the scope of the invention which is defined in the following claims.

I claim:

1. A coreless torque converter, comprising:
   a pump impeller driven by a prime mover;
   a turbine runner arranged opposite to said pump impeller, for hydrodynamically receiving a driving torque by flow of a recirculating fluid from said pump impeller and for transmitting the received driving torque to an output shaft; and
   a stator arranged within a clearance defined between said pump impeller and said turbine runner;
   said pump impeller, said turbine runner and said stator having respective vanes with tip ends which are arranged to be close to each other;
   at least one of said pump impeller, said turbine runner and said stator having a portion formed to have an axially reduced dimension so that flow of the fluid recirculating through the torque converter is thereby deflected in a manner that minimizes an offset of a center of a flow swirl in a flow of the recirculating fluid with respect to a center of said vane tip ends of said pump impeller, said turbine runner and said stator.

2. The coreless torque converter as set forth in claim 1, wherein:
   at least one of said pump impeller and said stator has associated vanes in portion of which an axial dimension is reduced for shifting said swirl center toward said center of said vane tip ends.

3. A coreless torque converter, comprising:
   a pump impeller driven by a prime mover;
   a turbine runner arranged opposite to said pump impeller, for hydrodynamically receiving the driving torque by flow of a recirculating fluid from said pump impeller and for transmitting the received driving torque to an output shaft; and
   a stator arranged within a clearance defined between said pump impeller and said turbine runner,
   wherein said pump impeller, said turbine runner and said stator are cooperating elements each having respective vanes with tip ends, the tip ends of each of these cooperating elements being disposed at predetermined small separations from tip ends of the others of these elements;
   wherein at least one of said pump impeller, said turbine runner and said stator has a portion formed to have an axial dimension at least partly reduced so that flow of the fluid recirculating through the torque converter is thereby deflected in a manner that minimizes an offset amount of a center of swirl of the recirculating fluid relative to a center of said vane tip ends of said pump impeller, said turbine runner and said stator, and
   wherein at least one of said pump impeller and said stator has associated vanes in portions of which an axial dimension is reduced for shifting said swirl center toward said center of said vane tip ends and said at least one of said pump impeller and said stator is a stator formed to have a portion providing a greater clearance between said stator and said pump impeller than a clearance between said stator and said turbine runner.

4. A coreless torque converter, comprising:
   a pump impeller driven by a prime mover;
   a turbine runner arranged opposite to said pump impeller, for hydrodynamically receiving the driving torque by flow of a recirculating fluid from said pump impeller and for transmitting the received driving torque to an output shaft; and
   a stator arranged within a clearance defined between said pump impeller and said turbine runner;
   said pump impeller, said turbine runner and said stator having respective vanes with tip ends, the tip ends of each of these cooperating elements being disposed at predetermined small separations from tip ends of the others of these elements;
   at least one of said pump impeller, said turbine runner and said stator having a portion formed to have an axial dimension at least partly reduced so that flow of the fluid recirculating through the torque converter is thereby deflected in a manner that minimizes an offset amount of a center of swirl of the recirculating fluid relative to a center of said vane tip ends of said pump impeller, said turbine runner and said stator wherein at least one of said pump impeller and said stator has associated vanes in portions of which an axial dimension is reduced for shifting said swirl center toward said center of said vane tip ends and said at least one of said pump impeller and said stator is a pump impeller formed to have a portion providing a greater clearance between said stator and said pump impeller than a clearance between said stator and said turbine runner.

5. A coreless torque converter, comprising:

a pump impeller driven by a prime mover;

a turbine runner arranged opposite to said pump impeller, for hydrodynamically receiving the driving torque by flow of a recirculating fluid from said pump impeller and for transmitting the received driving torque to an output shaft; and a stator arranged within a clearance defined between said pump impeller and said turbine runner;

said pump impeller, said turbine runner and said stator having respective vanes with tip ends, the tip ends of each of these cooperating elements being disposed at predetermined small separations from tip ends of the others of these elements;

at least one of said pump impeller, said turbine runner and said stator having a portion formed to have an axial dimension at least partly reduced so that flow of the fluid recirculating through the torque converter is thereby deflected in a manner that minimizes an offset amount of a center of swirl of the recirculating fluid relative to a center of said vane tip ends of said pump impeller, said turbine runner and said stator wherein at least one of said pump impeller and said stator has associated vanes in portions of which an axial dimension is reduced for shifting said swirl center toward said center of said vane tip ends wherein both of said pump impeller and said stator have respective vanes comprising portions of reduced axial dimension for jointly defining a clearance between said stator and said pump impeller which is greater than a clearance between said stator and said turbine runner.

6. The coreless torque converter according to claim 3, wherein:

said clearance between said stator and said pump impeller is 2 to 20 times said clearance between said stator and said turbine runner.

7. The coreless torque converter according to claim 4, wherein:

said clearance between said stator and pump impeller is 2 to 20 times said clearance between said stator and said turbine runner.

8. The coreless torque converter according to claim 5, wherein:

said clearance between said stator and said pump impeller is 2 to 20 times said clearance between said stator and said turbine runner.

9. The coreless torque converter as set forth in claim 1, wherein:

each vane of said turbine runner has a portion of which an axial dimension is reduced by a predetermined amount.

10. A coreless torque converter, comprising:

a pump impeller driven by a prime mover;

a turbine runner arranged opposite to said pump impeller, for hydrodynamically receiving the driving torque by flow of a recirculating fluid from said pump impeller and for transmitting the received driving torque to an output shaft; and a stator arranged within a clearance defined between said pump impeller and said turbine runner;

said pump impeller, said turbine runner and said stator having respective vanes with tip ends, the tip ends of each of these cooperating elements being disposed at predetermined small separations from tip ends of the others of these elements;

at least one of said pump impeller, said turbine runner and said stator having a portion formed to have an axial dimension at least partly reduced so that flow of the fluid recirculating through the torque converter is thereby deflected in a manner that minimizes an offset amount of a center of swirl of the recirculating fluid relative to a center of said vane tip ends of said pump impeller, said turbine runner and said stator, wherein said turbine runner has a smaller axial dimension relative to an axial dimension of said pump impeller.

11. The coreless torque converter according to claim 10, wherein:

said turbine runner has an axial dimension which is within a range of 0.9 to 0.5 times an axial dimension of said pump impeller.

* * * * *